US007252328B2

(12) United States Patent

Okada et al.

(10) Patent No.: US 7,252,328 B2

(45) Date of Patent: Aug. 7, 2007

(54) CONTROLLER FOR A MOVING MEMBER AND METHOD FOR SETTING A REFERENCE POSITION OF THE MOVING MEMBER

(75) Inventors: Kazukiyo Okada, Kosai (JP); Motoya Yamamoto, Hamamatsu (JP); Kazuyuki Hirai, Kosai (JP); Daisuke Mukai, Hamamatsu (JP); Yoshinobu Toyoda, Toyokawa (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/465,339

(22) Filed: Aug. 17, 2006

(65) Prior Publication Data

US 2007/0075570 A1 Apr. 5, 2007

Related U.S. Application Data

(62) Division of application No. 10/205,038, filed on Jul. 25, 2002, now Pat. No. 7,127,848.

(30) Foreign Application Priority Data

Jul. 25, 2001 (JP) ............................ 2001-224987
Jul. 31, 2001 (JP) ............................ 2001-232175

(51) Int. Cl.
*B60J 7/05* (2006.01)
*B60J 7/057* (2006.01)

(52) U.S. Cl. ....................................... 296/221; 296/223

(58) Field of Classification Search ................ 296/221, 296/223, 216.03, 216.05
See application file for complete search history.

(56) References Cited

U.S. PATENT DOCUMENTS

| | | | | |
|---|---|---|---|---|
| 5,399,950 | A | 3/1995 | Lu et al. | 318/565 |
| 5,410,226 | A | 4/1995 | Sekiguchi et al. | 318/266 |
| 5,483,133 | A | 1/1996 | Takabe et al. | 318/466 |
| 5,539,290 | A | 7/1996 | Lu et al. | 318/565 |
| 5,729,101 | A | 3/1998 | Richmond et al. | 318/282 |
| 5,977,732 | A | 11/1999 | Matsumoto | 318/283 |
| 6,028,370 | A | 2/2000 | Lamm et al. | 307/10.1 |
| 6,274,947 | B1 | 8/2001 | Terashima | 307/10.1 |
| 6,290,288 | B1 * | 9/2001 | Ritter et al. | 296/221 |
| 6,320,342 | B1 | 11/2001 | Yoshioka et al. | 318/467 |
| 6,588,835 | B2 * | 7/2003 | Horiuchi et al. | 296/221 |
| 6,617,812 | B2 | 9/2003 | Nagashima et al. | 318/280 |
| 6,688,683 | B1 * | 2/2004 | Kreiner et al. | 296/221 |
| 6,729,683 | B2 * | 5/2004 | Kreiner et al. | 296/223 |
| 7,023,161 | B2 | 4/2006 | Iwasaki et al. | 318/466 |

FOREIGN PATENT DOCUMENTS

| | | |
|---|---|---|
| JP | 05-180665 | 7/1993 |
| JP | 07-62947 | 3/1995 |
| JP | 2001-253242 | 9/2001 |

* cited by examiner

*Primary Examiner*—Dennis H. Pedder
(74) *Attorney, Agent, or Firm*—Marsh Fischmann & Breyfogle LLP

(57) ABSTRACT

A control apparatus for a movable vehicle roof panel determines the position of the panel in a tilt open state and evaluates whether the panel is in normal tilt-open range of positions or has, via inertia, traveled beyond those normal positions. The control apparatus allows movement to the closed position if movement beyond a permissible range has been achieved through roof panel inertia.

6 Claims, 11 Drawing Sheets

| Conditions for Permitting Tilt Down after Stopping in Each Pattern Conditions Met in Any of The Following Cases | | | |
|---|---|---|---|
| | Tilt A Area | Tilt Fully-Open Area | Tilt Fully-Open Achievement Flag |
| A1 | 0 | 1 | 1 (SET) |
| A2 | 0 | 0 | 1 (SET) |
| A3 | 1 | 0 | 0 (CLR) |
| A4 | 0 | 1 | 1 (SET) |
| A5 | 0 | 0 | 1 (SET) |

1: Condition Satisfied
0: Condition Unsatisfied

CONTROLLER FOR A MOVING MEMBER AND METHOD FOR SETTING A REFERENCE POSITION OF THE MOVING MEMBER

CROSS-REFERENCE TO RELATED APPLICATIONS

This application is a divisional application of U.S. patent application No. 10/205,038 filed Jul. 25, 2002 now U.S. Pat. No. 7,127,848, which claims priority from Japanese Patent Application No. 2001-224987 filed Jul. 25, 2001 and Japanese Patent Application No. 2001-232175 filed Jul. 31, 2001. Each of these applications is hereby incorporated by reference in its entirety as if set forth herein in full.

BACKGROUND OF THE INVENTION

The present invention relates to a control apparatus of controlling the operation of a movable member, such as the roof glass, window glass or slide door of an automobile, which opens or closes the opening, and to a method of setting the home position of the movable member.

DESCRIPTION OF THE RELATED ART

A conventional sunroof apparatus that is equipped on an automobile has a normal switch which allows a roof glass to open or close the skylight while being operated. There is another conventional sunroof apparatus which has automatic open and close switches in addition to the normal switch. Once the automatic open switch in the sunroof apparatus is operated, the roof glass slides nonstop from a fully-closed position to a fully-open position without requiring a subsequent continuous operation, thereby opening the skylight. Once the automatic close switch is operated, likewise, the roof glass slides nonstop from the fully-open position to the fully-closed position, thereby closing the skylight.

In general, the sunroof apparatus which performs such opening and closing operations has capabilities of detecting, for example, an elongated foreign matter, which accidentally enters the skylight, being caught between the periphery of the skylight and the roof glass during the closing actuation of the roof glass and reversing the moving direction of the roof glass to an opening direction from a closing direction. To achieve the capabilities, the sunroof apparatus normally has a detecting device for detecting the rotational direction and rotational period of a drive motor. As disclosed in, for example, Japanese Laid-Open Patent Publication No. Hei 5-180665, the detecting device has a pair of rotary sensors so arranged as to output pulse signals with different phases based on the rotation of the drive motor.

The detecting device detects the rotational period of the drive motor based on the pulse signals output from the rotary sensors and detects the rotational direction of the drive motor by using a phase difference between the pulse signals output from the rotary sensors. The sunroof apparatus counts the rotational period of the drive motor to detect the moving direction of the roof glass and the position of the roof glass by incrementing the count number in, for example, the opening direction of the roof glass and decrementing the count number in the closing direction.

That is, at the time of actuating the roof glass, the sunroof apparatus detects the position of the roof glass by incrementing or decrementing the count number based on the operation of the normal switch and stops the actuation of the roof glass by stopping the supply of a supply voltage to the drive motor in the fully-open position or fully-closed position. In a case where a foreign matter is caught in the roof glass during an automatic closing actuation, the drive motor is rotated reversely to reverse the moving direction of the roof glass and move the roof glass by a predetermined amount (predetermined count number), and detects the current position of the roof glass by switching decrementing of the count number to incrementing based on the reverse rotation of the drive motor.

There may be a case where the home position of the roof glass is deviated from a preset one for some reason. The deviation of the home position is equivalent to a deviation between the position of the roof glass that is detected based on the count number of the rotational period of the drive motor and the real position of the roof glass. In a case where the roof glass whose position has been detected based on the count number is located immediately before the fully-closed position, although the roof glass has actually reached the fully-closed position and will not be actuated further, therefore, the sunroof apparatus may erroneously decide that a foreign matter is caught in the roof glass and repeat the reverse action of the roof glass to the moving direction thereof in the fully-closed position. When a foreign matter, such as dust, is caught in roof rails or the like and the actuation of the roof glass is stopped in a catching detecting area located before the fully-closed position, the catching of the foreign matter is detected and the reverse action is carried out. This prevents the roof glass to be fully closed.

Therefore, the above-described apparatus counts the number of reverse actions, and, when that number goes to or beyond a specified number, judges that there is a possibility that the position of the roof glass based on the count number of the rotational period of the drive motor contains an error or there is some abnormality in the rules and sets the home position again.

In a cold place, there may be a case where the roof glass freezes and becomes inoperable. In this case, the inoperable state of the roof glass may be erroneously judged as having originated from a foreign matter being caught in the roof glass, so that the reverse action of the roof glass is executed. At this time, the number of reverse actions is counted as done in the case where a foreign matter is actually caught in the roof glass, though such catching has not occurred. In a cold place where the roof glass may freeze, the number of reverse actions is likely to exceed the specified number, so that the setting of the home position should be performed frequently, which is very troublesome.

SUMMARY OF THE INVENTION

The present invention has been devised to overcome the aforementioned problems and aims at providing a control apparatus and a method of setting the home position of a movable member, such as a roof glass, both of which can prevent an unnecessary operation of setting the home position of the movable member.

According to one aspect of the present invention, there is provided a control apparatus for a movable member, which has the following components. The movable member is movable between an opening position in which an opening of a frame is opened and a closing position in which the opening of the frame is closed. A drive motor actuates the movable member. A switch is operated to actuate the movable member. A position detecting device counts a predetermined parameter relating to the rotation of the drive motor and detects a position of the movable member based on the count number. Control means controls the drive motor to actuate the movable member based on an operation of the switch and the position of the movable member detected by the position detecting device. The control means rotates the drive motor reversely to reverse a moving direction of the movable member when movement of the movable member is obstructed by a foreign matter caught between the movable member and the opening of the frame while the movable member is moving toward the closing position, and sets a home position of the movable member by setting the count number to a predetermined value with the movable member placed in a predetermined position. The control means performs setting of the home position again when a number of times the reverse action of the movable member originated from catching of the foreign matter between the movable member and the opening of the frame has been carried out becomes equal to or greater than a specified number. An abnormality detecting device detects an abnormality in which the reverse action of the movable member is not carried out at the time when the movement of the movable member is obstructed, when the abnormality has occurred. When the abnormality detecting device detects the abnormality, the control means avoids setting again the home position.

According to another aspect of the present invention, there is provided a method of setting a home position of a movable member, which comprises the following steps. The movable member is movable between an opening position in which an opening of a frame is opened and a closing position in which the opening of the frame is closed, and is actuated by using a drive motor. A predetermined parameter relating to rotation of the drive motor is counted and a position of the movable member is detected based on the count number. The drive motor is rotated reversely to reverse a moving direction of the movable member when the movement of the movable member is obstructed by a foreign matter caught between the movable member and the opening of the frame while the movable member is moving toward the closing position. A home position of the movable member is set by setting the count number to a predetermined value with the movable member placed in a predetermined position. The setting of the home position is performed again when a number of times the reverse action of the movable member originated from catching of the foreign matter between the movable member and the opening of the frame has been carried out becomes equal to or greater than a specified number. An abnormality in which the reverse action of the movable member is not carried out at the time when the movement of the movable member is obstructed is detected, and then setting again the home position is avoided.

DETAILED DESCRIPTION OF THE PREFERRED EMBODIMENTS

A first embodiment of the present invention will be described below with reference to the accompanying drawings.

Figure 5:
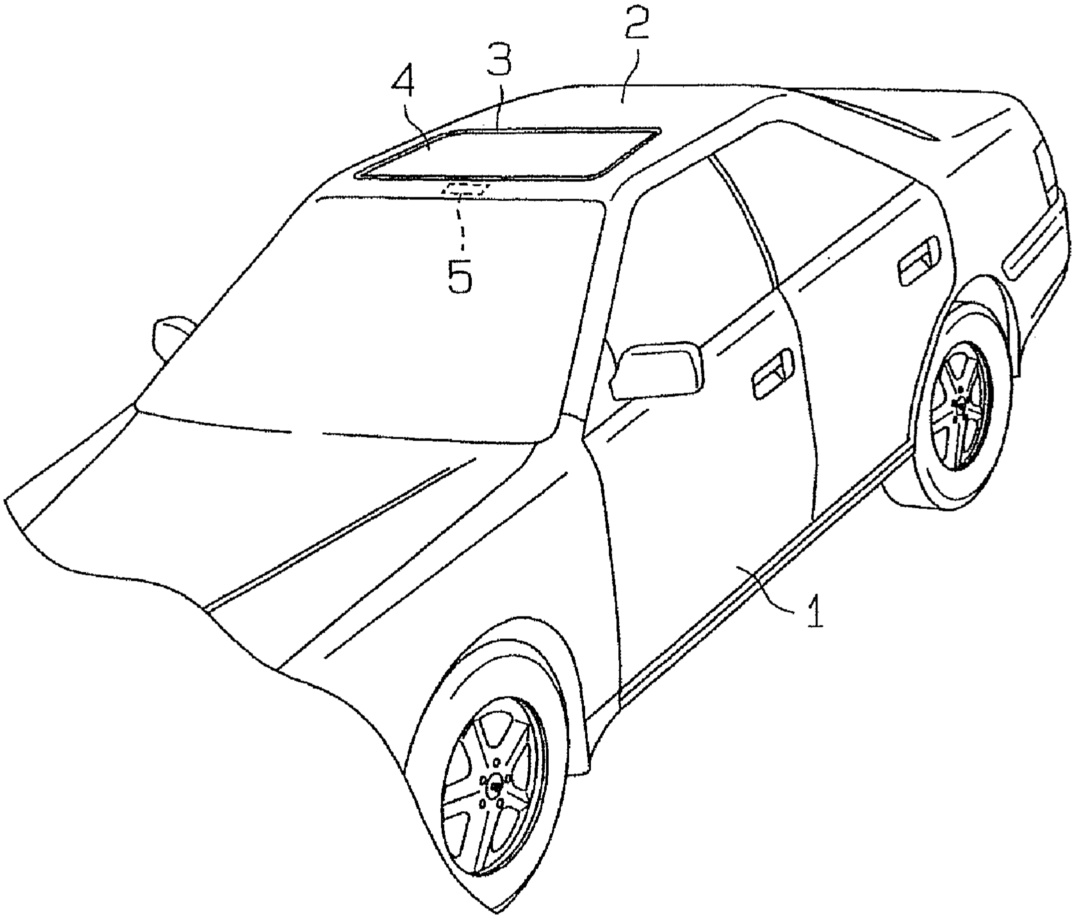
FIG. 5 is a perspective view of the essential portions of an automobile equipped with the sunroof apparatus.

FIG. 5 is a perspective view of the essential portions of an automobile equipped with a sunroof apparatus. A roof glass 4 as a movable member is provided in a skylight 3 or an opening, which is formed in a roof panel 2 in the frame of an automobile 1. The roof glass 4 is slidable back and forth along the automobile 1 and is tiltable about the axial line extending in the widthwise direction of the automobile 1 at the front end portion.

The roof glass 4 is actuated by a drive motor 5, as indicated by the broken line in FIG. 5, via an unillustrated drive transmission mechanism. The drive motor 5, together with a control circuit 11 for controlling the motor 5, constitutes a drive unit 10. The drive unit 10 is laid out in front of the skylight 3 between the roof panel 2 and the ceiling panel (not shown) in the room.

Figure 2:
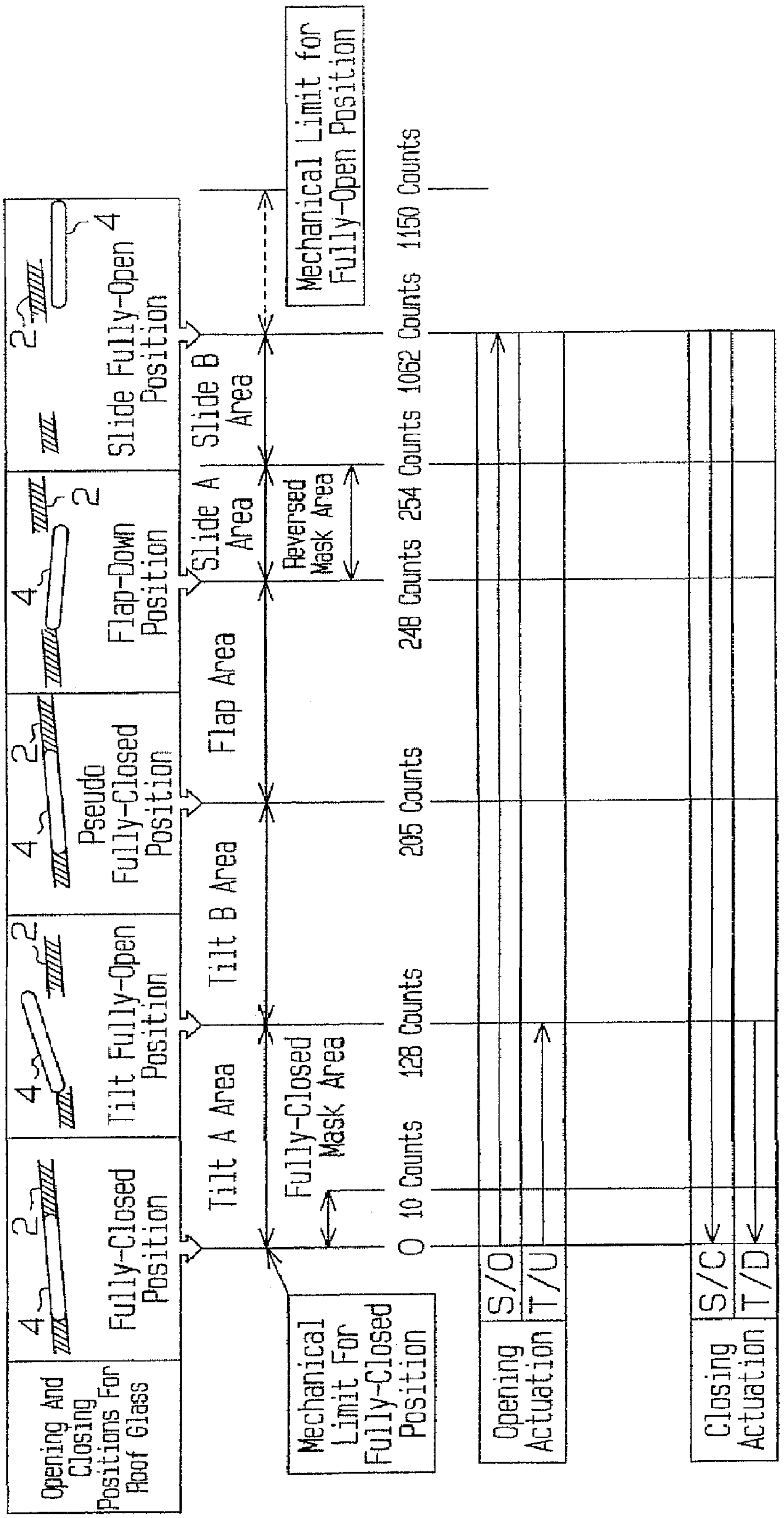
FIG. 2 is a diagram for explaining the operation of a roof glass.

As shown in FIG. 2, the roof glass 4 in the present embodiment has a fully-closed position, a tilt fully-open position, a pseudo fully-closed position, a flap-down position and a slide fully-open position. The roof glass 4 in the fully-closed position closes the entire skylight 3. When the roof glass 4 is slid and placed in the slide fully-open position, the roof glass 4 opens the skylight 3 entirely. The tilt fully-open position is the position where the rear end of the roof glass 4 rises most outward of the room. The flap-down position is the position where the rear end of the roof glass 4 goes down most inside the room. The pseudo fully-closed position is the position where the rear end of the roof glass 4 meets the rear end of the skylight 3 during shifting to the flap-down position from the tilt fully-open position, so that the roof glass 4 is placed as if the skylight 3 were closed, and where the rear end of the roof glass 4 passes instantaneously.

In the present embodiment, the actuation of the roof glass 4 to shift from the fully-closed position and pass the tilt fully-open position, the pseudo fully-closed position, the flap-down position and the slide fully-open position in order are called "slide opening" (S/O actuation in FIG. 2) and the reverse actuation is called "slide closing" (S/C actuation in FIG. 2). The slide opening and slide closing of the roof glass 4 are carried out by respectively manipulating a slide open switch SW2 and a slide close switch SW3 both shown in FIG. 1.

The actuation of the roof glass 4 from the fully-closed position to the tilt fully-open position is called "tilt opening" (T/U actuation in FIG. 2) and the reverse actuation is called "tilt closing" (T/D actuation in FIG. 2). The tilt-opening actuation and closing actuation of the roof glass 4 are carried out by respectively manipulating a tilt open switch SW4 and a tilt close switch SW5 shown in FIG. 1.

Figure 1:
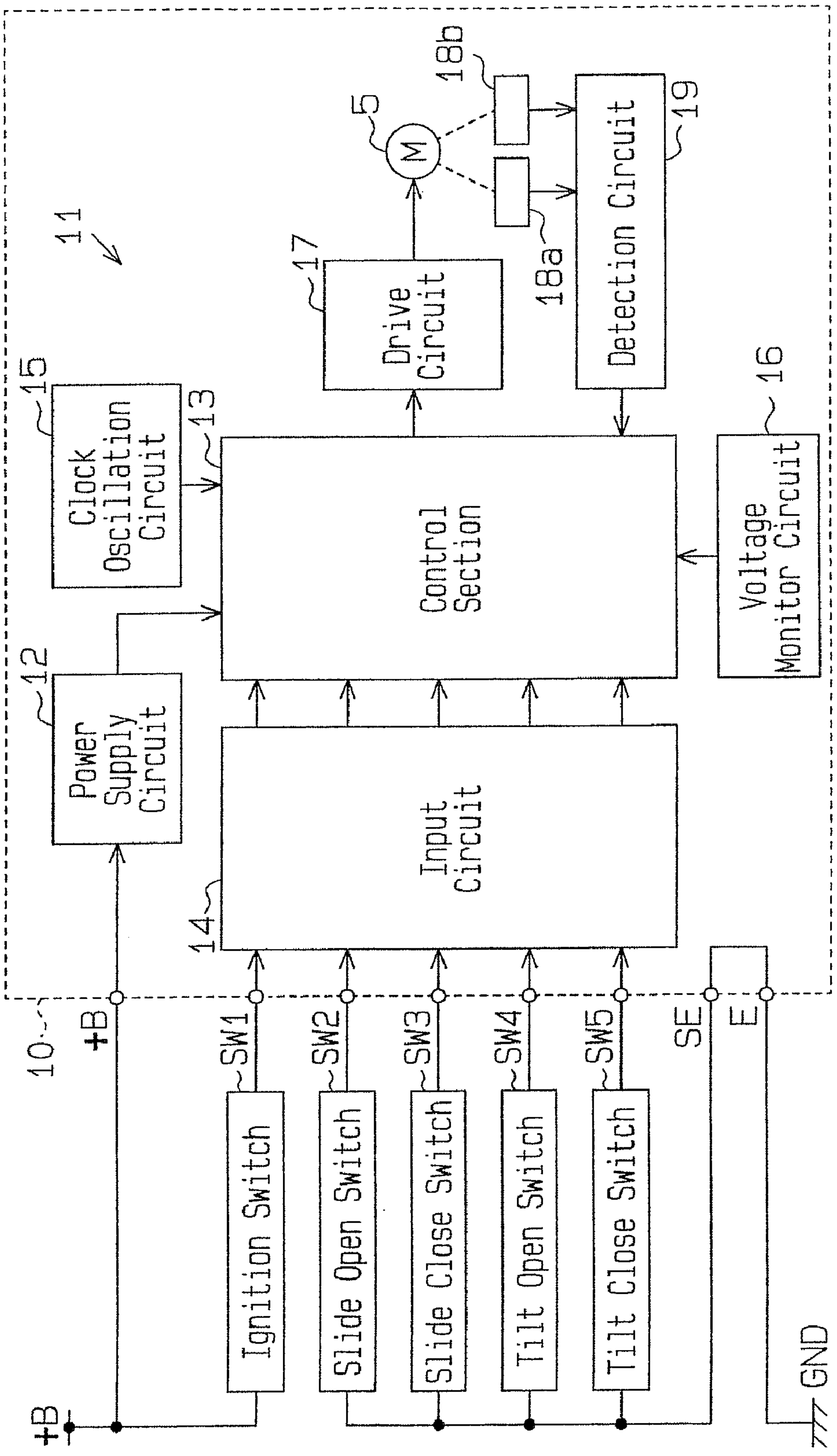
FIG. 1 is a block circuit diagram of a sunroof apparatus according to a first embodiment of the present invention.

FIG. 1 is a block circuit diagram for explaining the electric structure of a sunroof apparatus. The control circuit 11 for controlling the drive motor 5 is connected to a battery (not shown) and is supplied with a drive power source +B from the battery. The drive power source +B is adjusted to a predetermined voltage (e.g., 12 V) in a power supply circuit 12 in the control circuit 11, which is then supplied to a control section 13.

An ignition switch SW1 is supplied to the control circuit 11. The ignition switch SW1 is connected to the control section 13 via an input circuit 14 in the control circuit 11. The ignition switch SW1, when operated, outputs an operation signal (ON signal) to the control section 13 via the input circuit 14. In response to the ON signal from the ignition switch SW1, the control section 13 operates based on the drive power source supplied from the power supply circuit 12.

Various switches for operating the roof glass 4, namely, the slide open switch SW2, the slide close switch SW3, the tilt open switch SW4 and the tilt close switch SW5, are connected to the control circuit 11. The switches SW2 to SW5 are connected to the control section 13 via the input circuit 14 in the control circuit 11. Each of the switches SW2 to SW5, when operated, sends an instruction signal to the control section 13 via the input circuit 14. The instruction signal in the present embodiment is an ON signal with an L level (ground level).

A reference clock signal needed for the operation of the control section 13 is input to the control section 13 from a clock oscillation circuit 15. A voltage monitor circuit 16 monitors the drive power source supplied to the control section 13 from the power supply circuit 12. The control section 13 supplies the drive power source to the drive motor 5 via a drive circuit 17 and controls the motor 5.

Once the slide open switch SW2 is operated and an ON signal is input to the control section 13 from the switch SW2, the control section 13 in the present embodiment performs the following operation without enabling an OFF signal even if sent from the switch SW2 thereafter. That is, once the control section 13 receives the ON signal from the switch SW2, the control section 13 supplies the drive power source to the drive motor 5 and drives the motor 5 to automatically actuate the roof glass 4 nonstop from the fully-closed position to the tilt fully-open position, the pseudo fully-closed position, the flap-down position and the slide fully-open position in the named order. This actuation is called "automatic opening actuation". When the roof glass 4 is positioned in the slide fully-open position, the control section 13 stops supplying the drive power source to the drive motor 5 to stop the actuation of the roof glass 4.

Once the slide close switch SW3 is operated and an ON signal is input to the control section 13 from the switch SW3, on the other hand, the control section 13 performs the following operation without enabling an OFF signal even if sent from the switch SW3 thereafter. That is, once the control section 13 receives the ON signal from the switch SW3, the control section 13 supplies the drive power source to the drive motor 5 and drives the motor 5 to automatically actuate the roof glass 4 nonstop from the slide fully-open position to the fully-closed position in an order opposite to the order in the previous case. This actuation is called "automatic closing actuation". When the roof glass 4 is positioned in the fully-closed position, the control section 13 stops supplying the drive power source to the drive motor 5 to stop the actuation of the roof glass 4.

When the slide open switch SW2 or the slide close switch SW3 is operated while the roof glass 4 is automatically operating, the control section 13 stops supplying the drive power source to the drive motor 5 to stop actuating the roof glass 4, as mentioned above. When the slide open switch SW2 or the slide close switch SW3 is operated again, the control section 13 restarts supplying the drive power source to the drive motor 5 to move the roof glass 4 nonstop from the current stopped position to the slide fully-open position or the fully-closed position.

While the tilt open switch SW4 is being operated, i.e., while receiving the ON signal from the switch SW4, the control section 13 supplies the drive power source to the drive motor 5 to drive the motor 5 in order to open the roof glass 4 in accordance with the ON signal. This is called "manual opening actuation". When the operation of the tilt open switch SW4 is stopped and an OFF signal is input to the control section 13 from the switch SW4, the control section 13 stops supplying the drive power source to the drive motor 5 to stop the drive motor 5 in order to stop the actuation of the roof glass 4. In this case, when it is detected that the roof glass 4 has been placed in the tilt fully-open position, the control section 13 stops supplying the drive power source to the drive motor 5 to stop the actuation of the roof glass 4 even during the operation of the tilt open switch SW4.

While the tilt close switch SW5 is being operated, i.e., while receiving the ON signal from the switch SW5, the control section 13 supplies the drive power source to the drive motor 5 to drive the motor 5 in order to close the roof glass 4 in accordance with the ON signal. This is called "manual closing actuation". When the operation of the tilt close switch SW5 is stopped and an OFF signal is input to the control section 13 from the switch SW5, the control section 13 stops supplying the drive power source to the drive motor 5 to stop the drive motor 5 in order to stop the actuation of the roof glass 4. In this case, when it is detected that the roof glass 4 has been placed in the fully-closed position, the control section 13 stops supplying the drive power source to the drive motor 5 to stop the actuation of the roof glass 4 even during the operation of the tilt close switch SW5.

First and second magnetic sensors 18*a* and 18*b* comprised of a pair of Hall elements to detect the rotational period (rotational speed) and rotational direction of the drive motor 5 are provided on the circuit board of the control circuit 11. Specifically, a sensor magnet which has a plurality of S poles and N poles arranged alternately in the rotational direction of the rotary shaft (not shown) of the drive motor 5 are provided on the rotary shaft in such a way that the sensor magnet rotates together with the rotary shaft. The first and second magnetic sensors 18*a* and 18*b* are arranged near the sensor magnet at a predetermined interval in the rotational direction of the rotary shaft. The rotational period, rotational speed and rotational direction of the drive motor are parameters associated with the rotation of the motor.

As apparent from the above, a position detecting device in the present embodiment includes a non-contact type magnetic sensor which uses magnetism, and when the drive motor 5 is rotated, each of the magnetic sensors 18*a* and 18*b* sends a pulse-like output signal to a detection circuit 19. The output signals from the magnetic sensors 18*a* and 18*b* have a predetermined phase difference. The detection circuit 19 shapes the waveform of each output signal and sends the shaped signal to the control section 13.

Based on the period of the output signal from each magnetic sensor 18*a*, 18*b* received via the detection circuit 19, the control section 13 detects the rotational period (or the rotational speed) of the drive motor 5.

When receiving an ON signal from the slide open switch SW2 and the tilt open switch SW4 as the result of the operation of the switches, the control section 13 increments the count number of the rotational period of the drive motor 5 by “1” for each period of the output signal (pulse signal), for example, at the rising edge of that signal (see FIG. 2). When receiving an ON signal from the slide close switch SW3 and the tilt close switch SW5 as the result of the operation of the switches, on the other hand, the control section 13 decrements the count number incremented at the time of opening the roof glass 4 by “1” for each period of the output signal (pulse signal). Then, the control section 13 detects the position of the roof glass 4 according to the count number.

When the count number becomes equal to or smaller than “10”, as shown in FIG. 2, the roof glass 4 is regarded as being placed in the fully-closed position in the present embodiment. When the roof glass 4 is placed in the tilt fully-open position, the count number becomes “128” and when the roof glass 4 is placed in the pseudo fully-closed position, the count number becomes “205”. When the roof glass 4 is placed in the flap-down position, the count number becomes “248” and when the roof glass 4 is placed in the slide fully-open position, the count number becomes “1062”.

The area in which the count number ranges from “248” to “254” (slide A area in FIG. 2) is the area where a foreign-matter catching decision to be discussed later is not made or a reversed mask area. In the area in which the count number ranges from “254” to “1062” (slide B area in FIG. 2), foreign-matter catching decision is made. When the roof glass 4 is placed in the mechanical limit position on the fully-open side, the count number becomes “1150”. Setting of the home position, which is needed to determine the positional correlation between the roof glass 4 and the count number, is carried out by operating the tilt close switch SW5 for at least a predetermined time or a predetermined number of times to move the roof glass 4, placed in, for example, the mechanical limit position on the fully-closed side, further in the closing direction and setting the count number to “0”.

The control section 13 detects the rotational direction of the drive motor 5 in accordance with the phase difference between both output signals (pulse signals) and detects the opening/closing direction of the roof glass 4.

When a value calculated from the rotational period (rotational speed) of the drive motor 5 becomes greater than a predetermined decision value while the roof glass 4 is doing an automatic closing actuation, the control section 13 decides that the rotational period has become longer due to a foreign matter being caught between the roof glass 4 and the roof panel 2. Then, the control section 13 rotates the drive motor 5 reversely to release the foreign matter caught in the closing roof glass 4 and actuates the roof glass 4 in the opening direction by a specified amount (predetermined count number). This is called “reverse actuation”. At this time, the control section 13 switches the decrementing of the count number to incrementing based on the reverse rotation of the drive motor 5.

The control section 13 stores the number of reverse actions of the moving direction of the roof glass 4 caused as a result of the above decision. When the reverse action is repeated by a specified number of times (five in the present embodiment), there is a possibility that the position of the roof glass 4 which is detected based on the count number is in error, so that the control section 13 switches the operational mode to an inching mode from the normal mode based on the operation of each of the switches SW2 to SW5.

In the inching mode, the normal actuation (manual actuation) by the tilt open switch SW4 and the tilt close switch SW5 is possible and every time these switches are operated, the roof glass 4 inches by a predetermined shift amount (predetermined count number). The automatic actuation of the roof glass 4 based on the operation of the slide open switch SW2 or the slide close switch SW3 is inhibited. In a case where the slide open switch SW2 or the slide close switch SW3 is operated, the roof glass 4 inches by a predetermined shift amount (predetermined count number) every time the switch is operated. The inching of the roof glass 4 informs a user of the necessity of setting the home position again.

The processes that are executed by the control section 13 will be discussed below referring to FIGS. 3 and 4.

In step S1, the control section 13 determines whether an elongated foreign matter is caught in the roof glass 4 or not. That is, when the rotational period (rotational speed) of the drive motor 5 becomes longer (slower) than a predetermined decision value while the roof glass 4 is doing an automatic closing actuation in a slide B area shown in FIG. 2, the control section 13 decides that the elongated foreign matter is caught between the roof glass 4 and the roof panel 2 and hinders the movement of the roof glass 4, thus making the rotational period of the drive motor 5 longer (making the rotational speed slower). The control section 13 repeats this step S1 until catching of a foreign matter in the roof glass 4 occurs. When a foreign matter caught in the roof glass 4 disables the further closing of the roof glass 4, the control section 13 decides that catching of a foreign matter in the roof glass 4 has occurred and proceeds to step S2.

Even in a case where the home position is deviated for some reason, e.g., where the roof glass 4 has been detected as being positioned immediately before the fully-closed position, although the roof glass 4 has actually reached the fully-closed position and will not be actuated further, the control section 13 decides that catching of a foreign matter in the roof glass 4 has occurred and proceeds to step S2. In step S2, the control section 13 runs the drive motor 5 reversely to release a foreign matter caught in the roof glass 4 while closing, and starts opening the roof glass 4. At this time, the control section 13 starts measuring the reverse action time needed for the reverse action. The control section 13 then proceeds to step S3.

In step S3, the control section 13 determines whether or not the reverse action of the roof glass 4 has been performed by a predetermined specified amount (predetermined count number). If the roof glass 4 has not been moved in the opposite direction by the specified amount, the control section 13 proceeds to step S4.

In step S4, the control section 13 determines whether or not the reverse action time has exceeded a predetermined specified time. The specified time is set sufficiently longer than the time that is needed for the normal reverse action. If the reverse action time has not exceeded the specified time, the control section 13 returns to the step S3 and again determines whether or not the reverse action of the roof glass 4 has been performed by 'the predetermined specified amount. That is, the control section 13 determines whether the reverse action has been completed within the specified time or not in steps S3 and S4.

After the movement of the roof glass 4 is reversed by the specified amount, the control section 13 decides in step S3 that the reverse action has been executed properly and proceeds to step S5. The control section 13 increments the memorized number of reverse actions (or adds "1" to the number of reverse actions) in step S5 and proceeds to step S6 to stop supplying the drive power source to the drive motor 5 and finish the reverse action. The foreign matter is removed from between the skylight 3 and the roof glass 4 by the user until the reverse action is finished.

If the reverse action time exceeds the specified time, on the other hand, the control section 13 decides in the step S4 that the reverse action has not been carried out properly, i.e., that the roof glass 4 has not taken the reverse action due to freezing or the like and proceeds to step S7 to set an abnormal reverse flag. Then, the control section 13 increments the number of reverse actions (or adds "1" to the number of reverse actions) in step S5 and finishes the reverse action in step S6, as mentioned above, then proceeds to step S8.

When the control section 13 decides in step S8 that the reverse action has been repeated by a specified number of times (five times in the present embodiment), there is a possibility that the position of the roof glass 4 which is detected based on the count number is in error, so that the control section 13 proceeds to step S9. In the step S9, the control section 13 resets the memorized number of reverse actions to "0" and proceeds to step S10 to switch the operational mode to the inching mode from the normal mode.

Specifically, the control section 13 inhibits the automatic actuation of the roof glass 4 by the operation of the slide open switch SW2 or the slide close switch SW3, and controls the drive motor 5 to inch the roof glass 4 by a predetermined actuation amount (predetermined count number) in the direction corresponding to the switch SW2 or SW3 when the switch SW2 or SW3 is operated. The inching of the roof glass 4 informs a user of the necessity of setting the home position again.

Figure 4:
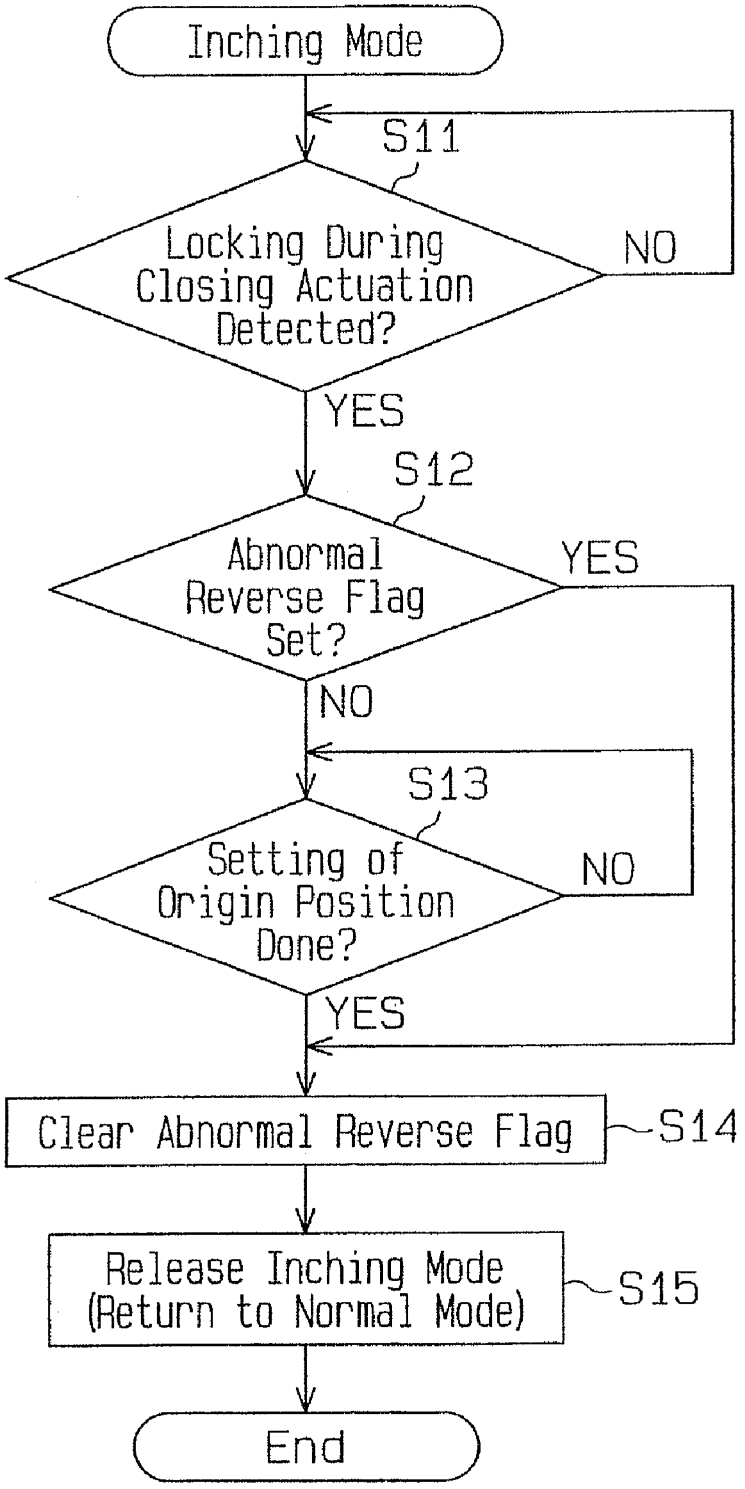
FIG. 4 is a flowchart illustrating a process in inching mode.

At the time of setting the home position in the inching mode, the control section 13 executes the process illustrated in FIG. 4.

In step S11, the control section 13 determines whether or not the roof glass 4 which is closing has reached a limit and been locked. If the roof glass 4 has not reached the limit yet, the control section 13 repeats the step S11. When the roof glass 4 has reached the limit and been locked, the control section 13 proceeds to step S12.

In step S12, the control section 13 determines whether or not the abnormal reverse flag has been set in the step S7. If the abnormal reverse flag is not set, the control section 13 decides that the specified number (five) of reverse actions performed have all been properly done and proceeds to step S13.

In step S13, the control section 13 determines whether setting of the home position has been done or not. When, with the roof glass 4 is placed at the positional limit, the setting of the home position, i.e., the setting of the count number to "10" by operating the tilt close switch SW5 for at least a predetermined time or a predetermined number of times is performed, the control section 13 clears the abnormal reverse flag in step S14 and proceeds to step S15 to release the inching mode and return to the normal mode.

When it is determined in the step S12 that the abnormal reverse flag is set, the control section 13 proceeds to step S14 to clear the abnormal reverse flag without performing the setting of the home position, and releases the inching mode and returns to the normal mode in step S15.

Figure 3:
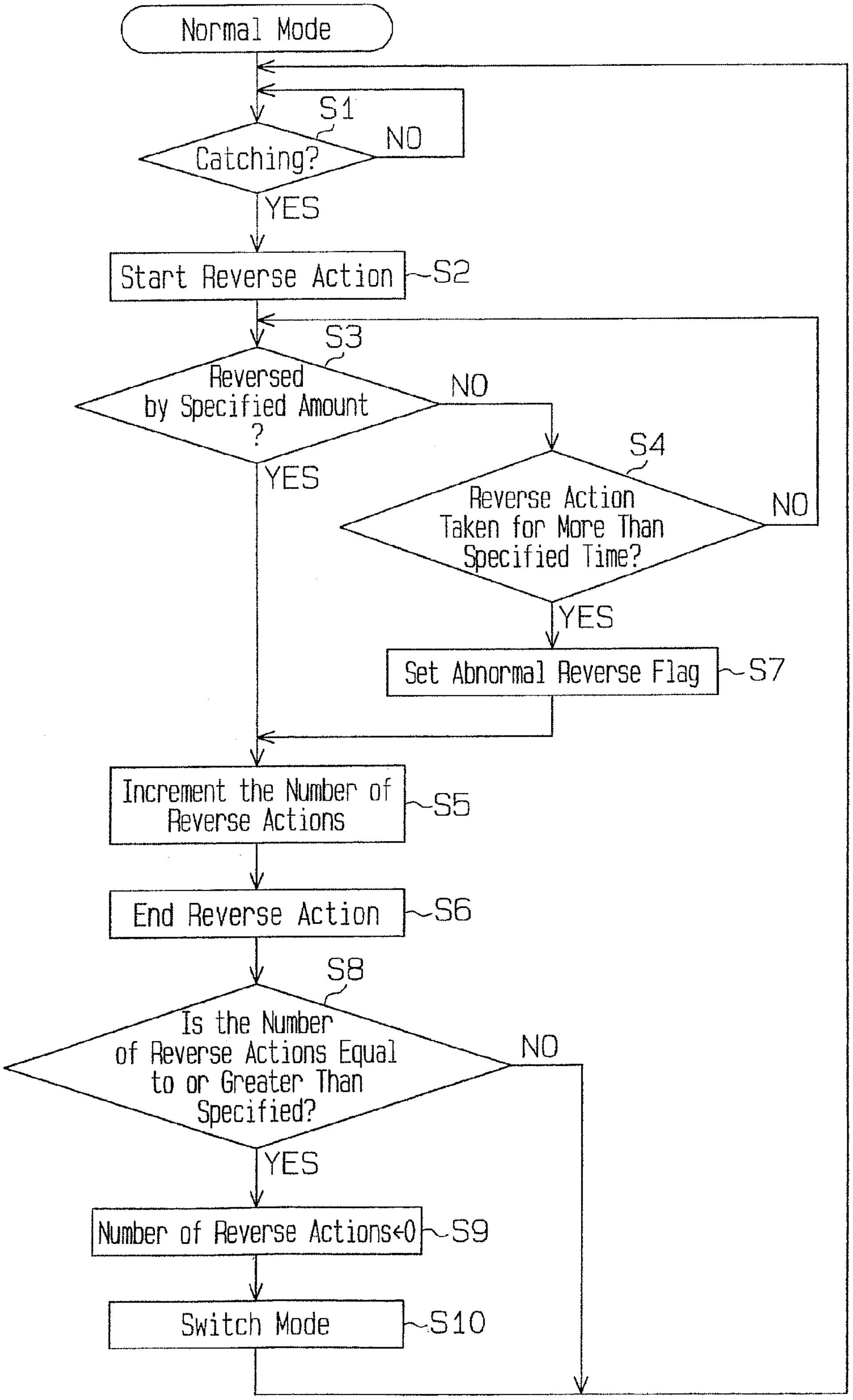
FIG. 3 is a flowchart illustrating a process in normal mode.

In other words, if at least one of the five reverse actions of the roof glass 4 attempted in the flowchart shown in FIG. 3 has not been carried out properly due to freezing or the like, the abnormal reverse flag is set. In that case, the setting of the home position is unnecessary so that the control section 13 skips step S13 to determine whether or not the home position is to be set. In a case where the roof glass 4 does not take a reverse action due to freezing or the like, therefore, it is unnecessary to set the home position and possible to avoid performing an unnecessary operation to set the home position, thereby reducing the troublesome operation by the user.

As apparent from the foregoing description, the sunroof apparatus according to the present embodiment has the following characteristics.

(1) In the present embodiment, even in a case where catching of a foreign matter in the roof glass 4 is detected, setting of the home position again is avoided when an abnormality such that the reverse action of the roof glass 4 is not performed properly due to freezing or the like. In such a case, therefore, an unnecessary operation to set the home position can be avoided, thereby reducing the troublesome operation by the user.

(2) In the present embodiment, the reverse action time is measured and it is determined that there is an abnormality when the measured reverse action time exceeds a specified time. It is therefore possible to easily detect an abnormality associated with a reverse action.

(3) In the present embodiment, when an abnormality is detected in at least one of five reverse actions of the roof glass 4 that have been attempted, an operation to set the home position again is avoided. This can allow the setting of the home position to be carried out sufficiently.

In the first embodiment, an abnormality in which the reverse action of the roof glass 4 is not executed due to freezing or the like is detected based on the reverse action time. This detection is not however limited, but may be carried out, for example, based on the load current of the drive motor 5 at the time of performing the reverse action.

Although the operational mode is switched to the inching mode to set the home position again when the number of reverse actions becomes equal to or greater than the specified number of "5" in the first embodiment, the specified number is not limited to "5" but may be changed as needed.

In the first embodiment, an operation to set the home position of the roof glass 4 is performed by setting the count number to "0" by operating the tilt close switch SW5 for at least a predetermined time or a predetermined number of times, for example, so as to actuate the roof glass 4, placed at the positional limit on the fully-open side, further in the closing direction. This operation to set the home position of the roof glass 4 is not however limited but may be altered as needed.

Although it is determined that catching of a foreign matter in the roof glass 4 has occurred when the value which is computed from the rotational period (rotational speed) of the drive motor 5 becomes greater than a predetermined decision value in the first embodiment, this decision on catching of a foreign matter is not limited.

Although the magnetic sensors 18*a* and 18*b* comprised of Hall elements are used in the position detecting device in the first embodiment, magnetic resistor elements whose resistances change in accordance with a change in magnetic field may be used. Besides those magnetic sensors, an optical rotary sensor, for example, may be used or a contact type rotary sensor which uses slide contacts may be used as well.

In the first embodiment, the control circuit 11, which has the first and second magnetic sensors 18*a* and 18*b* and the control section 13, and the drive motor 5 are constructed integrally as the drive unit 10. However, this structure is not limited but the control circuit 11 may be provided as separate from the drive motor 5.

Although the present invention is embodied into a sunroof apparatus which performs both the slide opening/closing operation and the tilt opening/closing operation in the first embodiment, the present invention may be embodied into a sunroof apparatus which performs only the slide opening/closing operation.

Although the present invention is embodied into a sunroof apparatus which uses a roof glass as a movable member in the first embodiment, the present invention may be embodied into other types of apparatuses, such as a power window apparatus which uses a window glass as a movable member and a slide door apparatus which uses a slide door as a movable member.

The supply voltage to be supplied to the control circuit 11, which is 12 V in the present embodiment, may take other values. Although the output signals from the magnetic sensors 18*a* and 18*b* have a phase difference of a ¼ period, the phase difference is not limited to this particular period as long as it can be processed by the control section 13.

The second embodiment of the invention will be discussed below, centering on the differences from the first embodiment, with reference to FIGS. 6 to 12. As same reference symbols are given to those members of the second embodiment which are identical to the corresponding members of the first embodiment, their detailed descriptions will be avoided.

Figure 6:
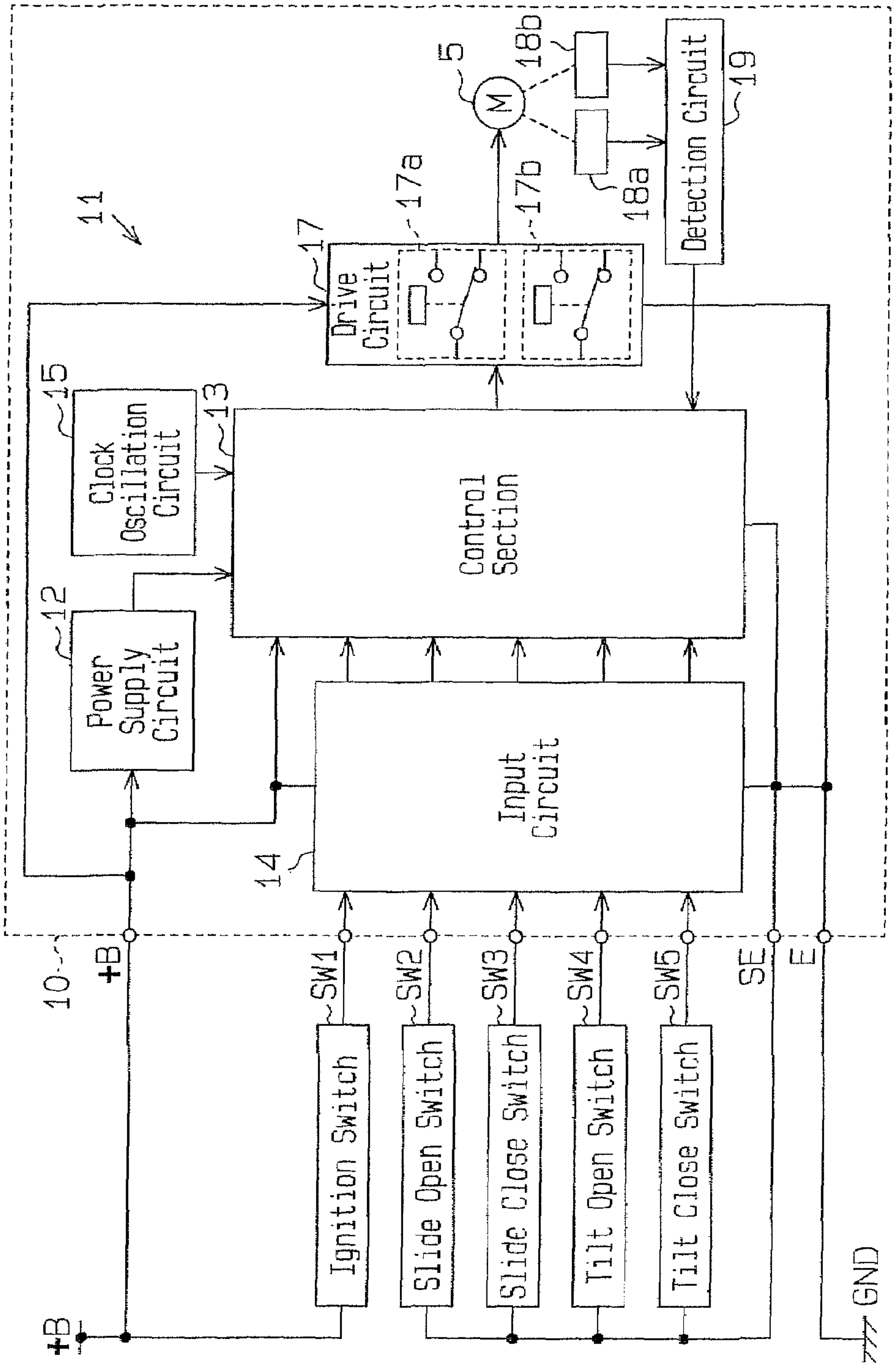
FIG. 6 is a block circuit diagram of a sunroof apparatus according to a second embodiment of the invention.

As shown in FIG. 6, a reference clock signal needed for the operation of the control section 13 is input to the control section 13 from the clock oscillation circuit 15. The control section 13 supplies the drive power source +B to the drive motor 5 via the drive circuit 17 and controls the motor 5. The drive circuit 17 has the first relay 17*a* and the second relay 17*b*. Each relay 17*a* or 17*b* selectively supplies, and stops supplying, the drive power source +B to the drive motor 5 to thereby rotate the motor 5 forward and reversely or stops the motor 5.

The action of the first relay 17*a* is switched on or off by the control section 13 when the automatic opening actuation of the roof glass 4 is executed based on the operation of the slide open switch SW2 and when the manual opening actuation of the roof glass 4 is executed based on the operation of the tilt open switch SW4.

The action of the second relay 17*b* is switched on or off when the automatic closing actuation of the roof glass 4 is executed based on the operation of the slide close switch SW3 and when the manual closing actuation of the roof glass 4 is executed based on the operation of the tilt close switch SW5.

The output signals (pulse signals) from the first and second magnetic sensors 18*a* and 18*b* in the present embodiment have a predetermined phase difference (¼ period).

When receiving an ON signal as a result of the operation of the slide open switch SW2 or the tilt open switch SW4, the control section 13 increments the count number of the rotational period of the drive motor 5 by "1" at the rising and falling edges of the output signal (pulse signal) from, for example, the second magnetic sensor 18*b* (see FIG. 2).

When receiving an ON signal from the slide close switch SW3 or the tilt close switch SW5 as the result of the operation of that switch, the control section 13 decrements the count number incremented at the time of opening the roof glass 4 by "1" for each edge of the output signal (pulse signal) from the sensor 18*b*. Then, the control section 13 detects the position of the roof glass 4 according to the count number.

Figure 7:
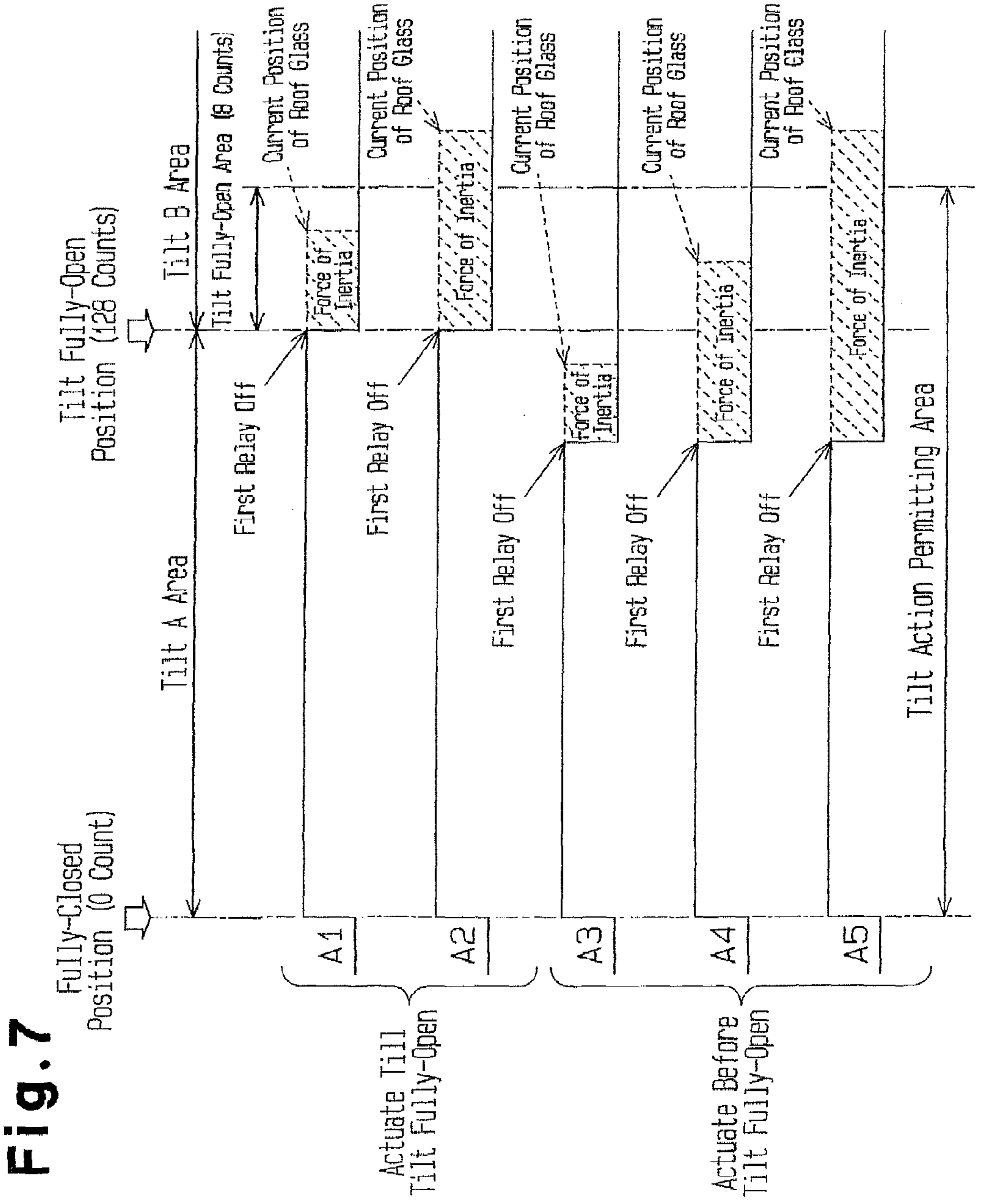
FIG. 7 is a diagram for explaining tilt-down permitting conditions for the roof glass.

In the second embodiment, as per the first embodiment, the position and area of the roof glass 4 are set in accordance with the count number of the rotational period of the drive motor 5 as shown in FIG. 2. As shown in FIG. 7, the area that extends from the tilt fully-open position (count number of "128") to the position of the count number of "136" incremented therefrom toward the pseudo fully-closed position by "8" is regarded as being in a tilt fully-open state and is set as a tilt fully-open area. In the present embodiment, the area that extends from the fully-closed position to the position at the edge of the tilt fully-open area, which includes the tilt fully-open area, is set as a tilt action permitting area based on the operations of the tilt open switch SW4 and the tilt close switch SW5. Though not illustrated, an area of four counts around the position of the count number of "132", which is set as a reference, may be set as the tilt fully-open position.

Figure 11:
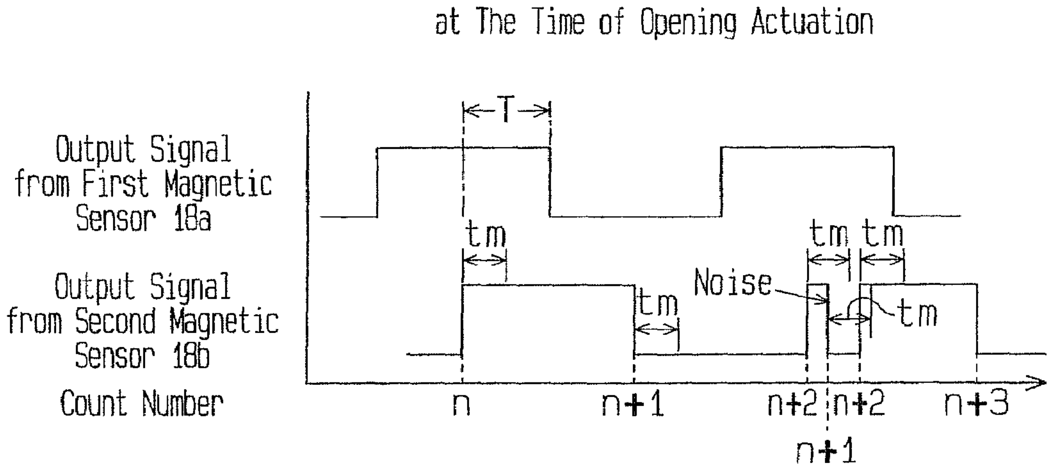
FIGS. 11(*a*) and 11(*b*) are waveform diagrams for explaining a counting operation when noise is generated in an output signal from a sensor.
Figure 11:
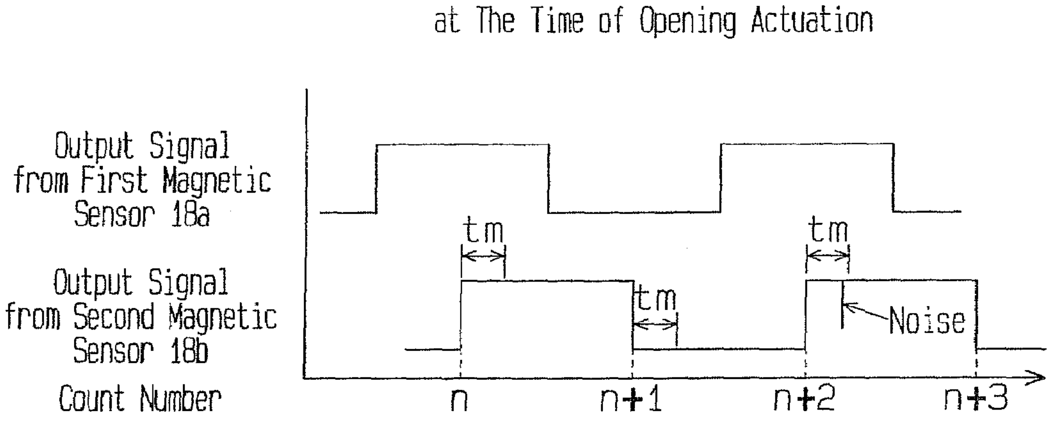

As shown in FIGS. 11(*a*) and 11(*b*), when noise is generated in the output signal (pulse signal) from, for example, the second magnetic sensor 18*b*, the noise may be erroneously recognized as a proper change in output signal, so that a counting operation is carried out accordingly. To prevent the count number from being in error even when noise occurs in the output signal, the control section 13 of the present embodiment performs the counting operation according to a process flow shown in FIG. 12. The process flow is executed at every rising or falling edge of the second magnetic sensor 18*b*. FIGS. 11(*a*) and 11(*b*) show the waveforms of the output signals (pulse signals) from the first and second magnetic sensors 18*a* and 18*b* at the time of opening the roof glass 4. At the time of closing the roof glass 4, by way of contrast, the level of the output signal from the second magnetic sensor 18*b* becomes opposite to the signal level at the time of opening the roof glass 4, though not illustrated.

Figure 12:
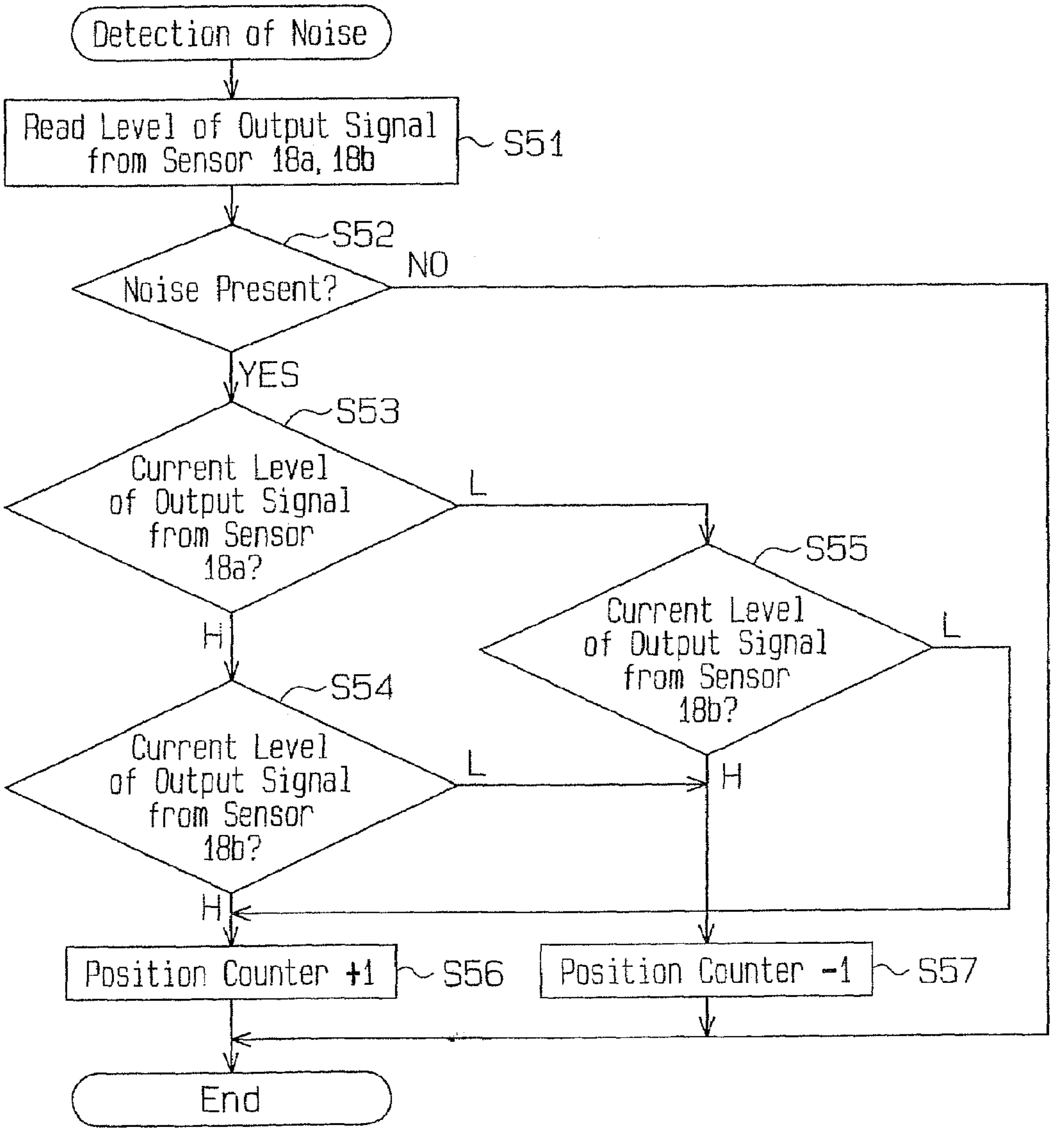
FIG. 12 is a flowchart for explaining the counting operation when noise is generated in an output signal from a sensor.

In step S51 in FIG. 12, the control section 13 detects the level of the output signal from each sensor 18*a*, 18*b* after a predetermined time tm passes from the edge of the output signal from the second magnetic sensor 18*b* and proceeds to step S52. The predetermined time tm in this embodiment is set sufficiently shorter than a time T which spans from the edge of the output signal from the second magnetic sensor 18*b* in normal operational mode to the edge of the output signal that is output from the first magnetic sensor 18*a* immediately thereafter.

In step S52, the control section 13 determines whether or not the level of the output signal that is acquired from the second magnetic sensor 18*b* after passage of the predetermined time tm from the edge of that output signal differs from the level of the output signal acquired from the sensor 18*b* immediately after the edge of the output signal therefrom. In normal operational mode, the level of the output signal does not change even after the predetermined time tm passes from the edge of the output signal as indicated by the first waveform of the output signal of the second magnetic sensor 18*b* shown in FIG. 11(*a*). In a case where the level of the output signal acquired from the second magnetic sensor 18*b* after passage of the predetermined time tm from the edge of that output signal is the same as the level of the output signal acquired from the sensor 18*b* immediately after the edge of the output signal therefrom, therefore, the control section 13 decides that there is no noise. As a result, the control section 13 recognizes that the roof glass 4 is actuating properly, then terminates the process. In this case, noise which, as shown in FIG. 11(*b*), varies instantaneously within the predetermined time tm is not counted.

When, like the second waveform of the output signal from the second magnetic sensor 18*b*, the level of the output signal acquired from the second magnetic sensor 18*b* after passage of the predetermined time tm from the rising or falling edge of that output signal differs from the level of the output signal acquired from the sensor 18*b* immediately after the edge of the output signal therefrom, the control section 13 decides in step S52 that there is noise and proceeds to step S53.

In a case where the control section 13 decides in steps S53 to S55 that the output signals from the magnetic sensors 18*a* and 18*b* both have an H level or an L level, i.e., in a case where both output signals have the same level, the control section 13 adds "1" to the count number for detecting the position of the roof glass 4 in step S56, then terminates the process. Because the output signals from the magnetic sensors 18*a* and 18*b* both have an H level or an L level when the roof glass 4 is opening properly, the count number is incremented through steps S53, S54 and S56 or steps S53, S55 and S56.

In a case where the control section 13 decides that the output signals from the magnetic sensors 18*a* and 18*b* respectively have different levels, such as an H level and an L level or an L level and an H level, on the other hand, the control section 13 subtracts "1" from the count number for detecting the position of the roof glass 4 in step S57, then terminates the process. Because the output signals from the magnetic sensors 18*a* and 18*b* respectively have an H level and an L level or an L level and an H level when the roof glass 4 is closing properly, the count number is decremented through steps S53, S54 and S57 or steps S53, S55 and S57.

In a case where the count number is incremented during the opening actuation of the roof glass 4 in steps S53 to S57, the control section 13 temporarily decrements the count number at the falling edge (start edge) of relatively large noise shown in FIG. 11(*a*) and increments the count number at the rising edge (end edge) of the noise. In a case where, though not illustrated, the count number is decremented during the closing actuation of the roof glass 4, on the other hand, the control section 13 temporarily increments the count number at the start edge of noise and decrements the count number at the end edge of the noise. That is, in a case where such relatively large noise is generated, even if the counting operation originated from the noise is executed, noise-originated increment or decrement of the count number is finally canceled out, so that the normal count number does not have an error.

When the value computed from the rotational speed (rotational period) of the drive motor 5 becomes smaller than the predetermined decision value while the automatic closing actuation of the roof glass 4 is underway, the control section 13 decides that a foreign matter is caught between the roof glass 4 and the roof panel 2, which has made the rotational speed slower (the rotational period longer). Then, the control section 13 rotates the drive motor 5 reversely to release the foreign matter caught in the roof glass 4 during the closing actuation and reverse the moving direction of the roof glass 4 in the fully-open direction by a specified amount (predetermined count number). At this time, the control section 13 switches the decrementing of the count number to incrementing based on the reverse rotation of the drive motor 5.

Further, the control section 13 according to the present embodiment performs tilt closing (tilt down) control in consideration of the overrun of the drive motor 5 in the vicinity of the fully-open position (tilt fully-open area) caused by the force of inertia. Specifically, the control section 13 performs the process based on the flowchart of tilt closing (tilt down) illustrated in FIG. 8.

Figure 8:
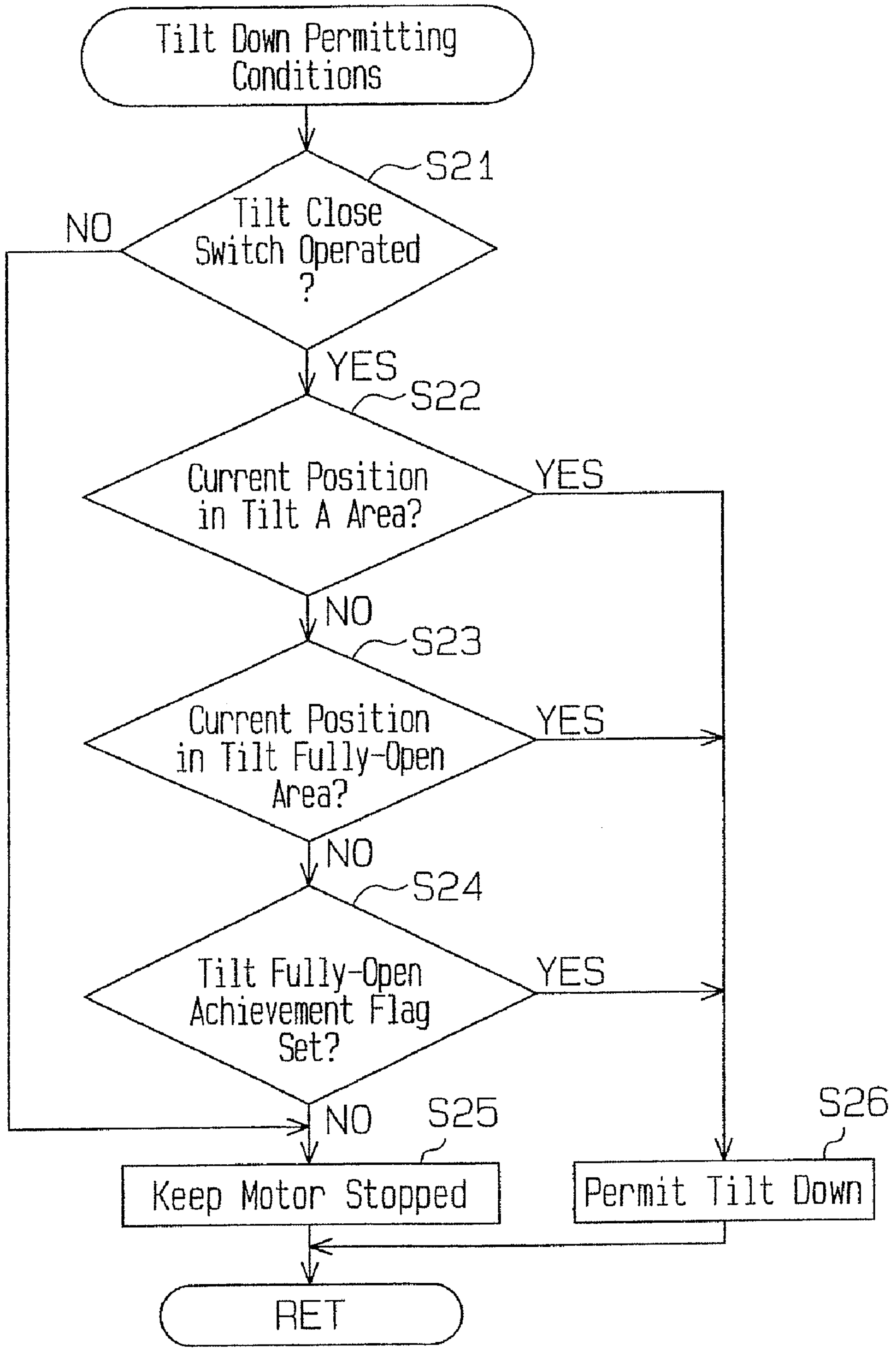
FIG. 8 is a flowchart for explaining the tilt-down permitting conditions for the roof glass.

In step S21 in FIG. 8, the control section 13 detects whether the tilt close switch SW5 has been operated to perform tilt closing of the roof glass 4. When the tilt close switch SW5 is not operated, the control section 13 proceeds to step S25 and keeps the drive motor 5 stopped. When the tilt close switch SW5 is operated, the control section 13 proceeds to step S22.

In step S22, the control section 13 determines whether the current position of the roof glass 4 lies within the tilt A area before the tilt fully-open position shown in FIG. 7 or not. Specifically, in the case indicated by a symbol "A3" in FIG. 7, the decision in step S22 becomes YES and the control section 13 goes to step S26. The symbol "A3" indicates the case where at the time of tilt opening before the tilt closing of the roof glass 4 takes place, the first relay 17*a* is switched off before the tilt fully-open position to stop supplying the supply voltage to the drive motor 5, after which the roof glass 4 is placed before the tilt fully-open area even with the force of inertia acting on the roof glass 4.

In this case, in step S26, the control section 13 permits tilt closing (tilt down) and drives the drive motor 5 in response to the operation of the tilt close switch SW5 to perform tilt closing (tilt down) of the roof glass 4.

In case where the current position of the roof glass 4 does not lie within the tilt A area, specifically, in the cases indicated by symbols "A1", "A2", "A4" and "A5" in FIG. 7, the decision in step S22 becomes NO and the control section 13 goes to step S23.

The symbol "A1" indicates the case where at the time of tilt opening before the tilt closing of the roof glass 4 takes place, the first relay 17*a* is switched off in the tilt fully-open position to stop supplying the supply voltage to the drive motor 5, after which the force of inertia causes the roof glass 4 to be stopped in the tilt fully-open area.

The symbol "A2" indicates the case where the first relay 17*a* is switched off in the tilt fully-open position to stop supplying the supply voltage to the drive motor 5, after which the force of inertia causes the roof glass 4 to pass the tilt fully-open area.

The symbol "A4" indicates the case where the first relay 17*a* is switched off before the tilt fully-open position to stop supplying the supply voltage to the drive motor 5, after which the force of inertia causes the roof glass 4 to be stopped in the tilt fully-open area.

The symbol "A5" indicates the case where the first relay 17*a* is switched off before the tilt fully-open position to stop supplying the supply voltage to the drive motor 5, after which the force of inertia causes the roof glass 4 to pass the tilt fully-open area.

In step S23, the control section 13 determines whether the roof glass 4 is positioned in the tilt fully-open area or not. In a case where the roof glass 4 is stopped in the tilt fully-open area (the cases of "A1" and "A4"), the control section 13 proceeds to step S26 and permits tilt closing (tilt down).

In a case where the roof glass 4 is not positioned in the tilt fully-open area but is placed out of the tilt action permitting area, i.e., in a case where the roof glass 4 passes the tilt fully-open area (the cases of "A2" and "A5"), the control section 13 proceeds to step S24.

Figure 9:
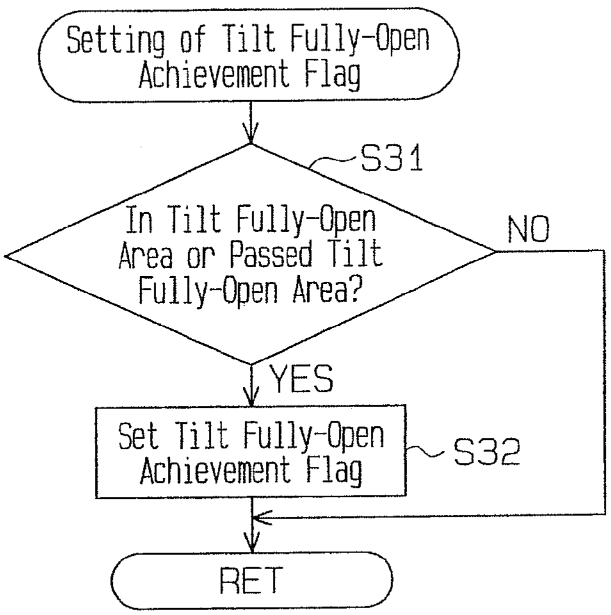
FIG. 9 is a flowchart for explaining conditions for setting a tilt fully-open achievement flag.
Figure 10:
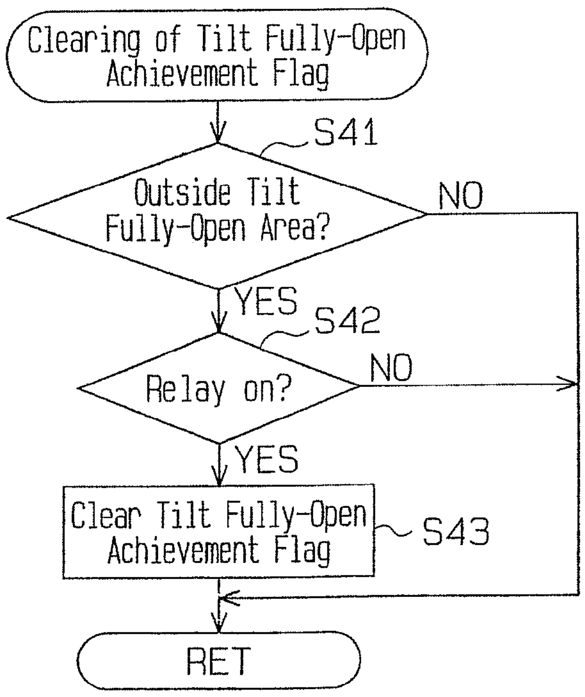
FIG. 10 is a flowchart for explaining conditions for clearing the tilt fully-open achievement flag.

In step S24, the control section 13 determines whether a tilt fully-open achievement flag is set or not. FIG. 9 shows an interruption process for setting the tilt fully-open achievement flag, and FIG. 10 shows an interruption process for clearing the tilt fully-open achievement flag. The control section 13 adequately executes those interruption processes during the execution of the tilt down process in FIG. 8.

In a case where the control section 13 determines in step S31 in FIG. 9 that the roof glass 4 lies either in the tilt fully-open area or has passed the tilt fully-open area, the control section 13 sets the tilt fully-open achievement flag in step S32. That is, in the cases of "A1", "A2", "A4" and "A5", the control section 13 sets the tilt fully-open achievement flag. In the case of "A3", the roof glass 4 has not passed the tilt fully-open area yet, so that the control section 13 clears the tilt fully-open achievement flag. The control section 13 also sets the tilt fully-open achievement flag at the time of performing the slide opening actuation in which the roof glass 4 passes the tilt fully-open area.

The control section 13 clears the tilt fully-open achievement flag when and only when the roof glass 4 has passed the tilt fully-open area and is located outside that area (outside the tilt action permitting area). In the cases of "A1" and "A4" shown in FIG. 7, the roof glass 4 does not pass and in the cases of "A2" and "A5", the first relay 17*a* is off (the drive motor 5 is not active) and the force of inertia causes the roof glass 4 to pass the tilt fully-open area and to be positioned outside that area. In any of those cases, therefore, the control section 13 keeps the tilt fully-open achievement flag set. At the time the slide opening actuation takes place, the first relay 17*a* is on, i.e., the drive motor 5 is running, so that the tilt fully-open achievement flag is cleared when the roof glass 4 passes the tilt fully-open area and is positioned outside that area.

If the tilt fully-open achievement flag is set in the step S24 shown in FIG. 8, the control section 13 proceeds to step S26 and permits tilt closing (tilt down).

As apparent from the foregoing description, according to the present embodiment, even when the drive motor 5 becomes inactive in the tilt A area and the tilt fully-open area (within tilt action permitting area) and the force of inertia causes the roof glass 4 to pass the tilt fully-open area and to be positioned outside the tilt fully-open area (outside the tilt action permitting area), tilt closing (tilt down) is allowed if the tilt fully-open achievement flag is set. Therefore, the tilt closing of the roof glass 4 can be carried out in response to the operation of the tilt close switch SW5, so that the operator does not feel awkward in manipulating the roof glass 4.

According to the present embodiment, in a case where, at the time the tilt opening actuation takes place, the inactive state of the drive motor 5 is detected in the tilt action permitting area (in the tilt A area and the tilt fully-open area) and the roof glass 4 is placed outside the tilt action permitting area (the roof glass 4 has passed the tilt fully-open area and is placed outside that area), the roof glass 4 is regarded as being placed in the tilt action permitting area and the tilt closing actuation in response to the operation of the tilt close switch SW5 is permitted the next time the tilt closing actuation takes place. In other words, at the time of stopping the drive motor 5 to stop the roof glass 4 in the tilt action permitting area when the tilt opening actuation takes place, the roof glass 4 is regarded as being positioned in the tilt action permitting area even when the roof glass 4 is placed outside the tilt action permitting area by the force of inertia, and the next tilt closing actuation can be carried out. In this case, therefore, while the roof glass 4 is actually positioned outside the tilt action permitting area, the tilt close switch SW5 can be operated, thereby suppressing the awkward feeling the operator has.

According to the present embodiment, at the time of clearing the tilt fully-open achievement flag, the activation state of the drive motor 5 is detected based on the ON/OFF state of the relay 17*a* which permits the supply voltage to be supplied to the drive motor 5. This makes it possible to easily detect the activation state of the drive motor 5.

What is claimed is:

1. A sunroof control apparatus comprising:

a roof glass which is so provided as to be slidable along a skylight of a vehicle and tiltable about one axial line and is placeable in a fully-closed position where said skylight is fully closed, a tilt fully-open position where one side of said skylight is opened as one side of said roof glass is placed outside said vehicle by a tilt action of said roof glass, and a fully-open position where said skylight is fully opened as said roof glass is moved along said skylight;

a drive motor for tilting and sliding said roof glass;

a tilt switch which is operated to actuate said roof glass between said fully-closed position and said tilt fully-open position;

a detecting device for detecting whether said drive motor is running;

control means which controls said drive motor to actuate said roof glass based on an operation of said tilt switch and executes operations of:

setting a tilt action permitting area in such a way as to include an area from said fully-closed position to said tilt fully-open position; and permitting a tilt action of said roof glass toward said fully-closed position based on said operation of said tilt switch, when a non-active state of said drive motor is detected in said tilt action permitting area while said roof glass is tilted to said tilt fully-open position from said fully-closed position and when said roof glass moves outward beyond said tilt action permitting area due to force of inertia.

2. The sunroof control apparatus according to claim 1, further comprising a relay for supplying a supply voltage to said drive motor and said detecting device detects whether or not said drive motor is running, based on an ON/OFF state of said relay.

3. The sunroof control apparatus according to claim 1, wherein said control means:

sets a flag when said non-active state of said drive motor is detected in said tilt action permitting area while said roof glass is tilted to said tilt fully-open position from said fully-closed position and when said roof glass moves outward beyond said tilt action permitting area due to the force of inertia; and permits a tilt action of said roof glass toward said fully-closed position based on said operation of said switch in a case where said flag is set at a time of a next tilt action.

4. A control method for a roof glass which, in accordance with actuation of a drive motor, is placeable in a fully-closed position where a skylight of a vehicle is fully closed, a tilt fully-open position where one side of said skylight is opened as one side of said roof glass is placed outside said vehicle by a tilt action of said roof glass and a fully-open position-where said skylight is fully opened as said roof glass is moved along said skylight, a tilt action permitting area being set in such a way as to include an area from said fully-closed position to said tilt fully-open position, said method comprising the steps of:

permitting a tilt action of said roof glass toward said fully-closed position based on said operation of a tilt switch, when a non-active state of said drive motor is detected in said tilt action permitting area while said roof glass is tilted to said tilt fully-open position from said fully-closed position and when said roof glass moves outward beyond said tilt action permitting area due to force of inertia.

5. The control method for a roof glass according to claim 4:

wherein whether said drive motor is running is detected based on an ON/OFF state of said relay.

6. The control method according to claim 4:

wherein a flag is set when said non-active state of said drive motor is detected in said tilt action permitting area while said roof glass is tilted to said tilt fully-open position from said fully-closed position and when said roof glass moves outward beyond said tilt action permitting area due to the force of inertia; and wherein a tilt action of said roof glass toward said fully-closed position based on said operation of said tilt switch is permitted in a case where said flag is set at a time of a next tilt action.

* * * * *